Sept. 4, 1962    C. E. J. NYBERG    3,052,261
FLUID COUPLING
Filed Jan. 15, 1959    2 Sheets-Sheet 1
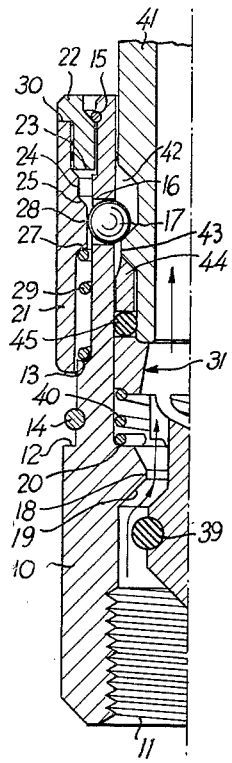
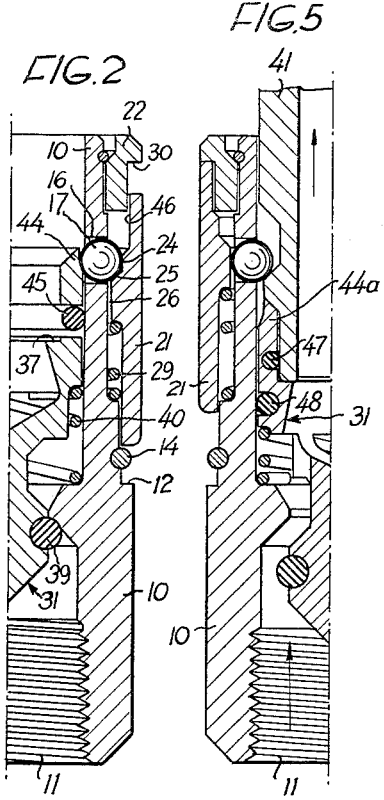
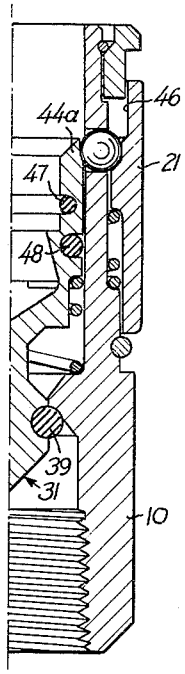
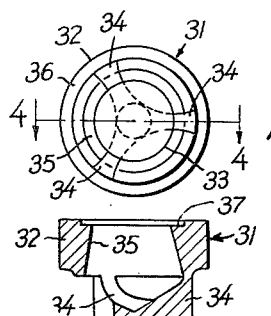
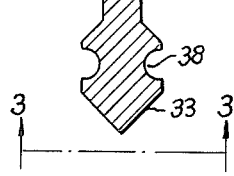
Carl E. J. Nyberg
INVENTOR.
BY
AGENT

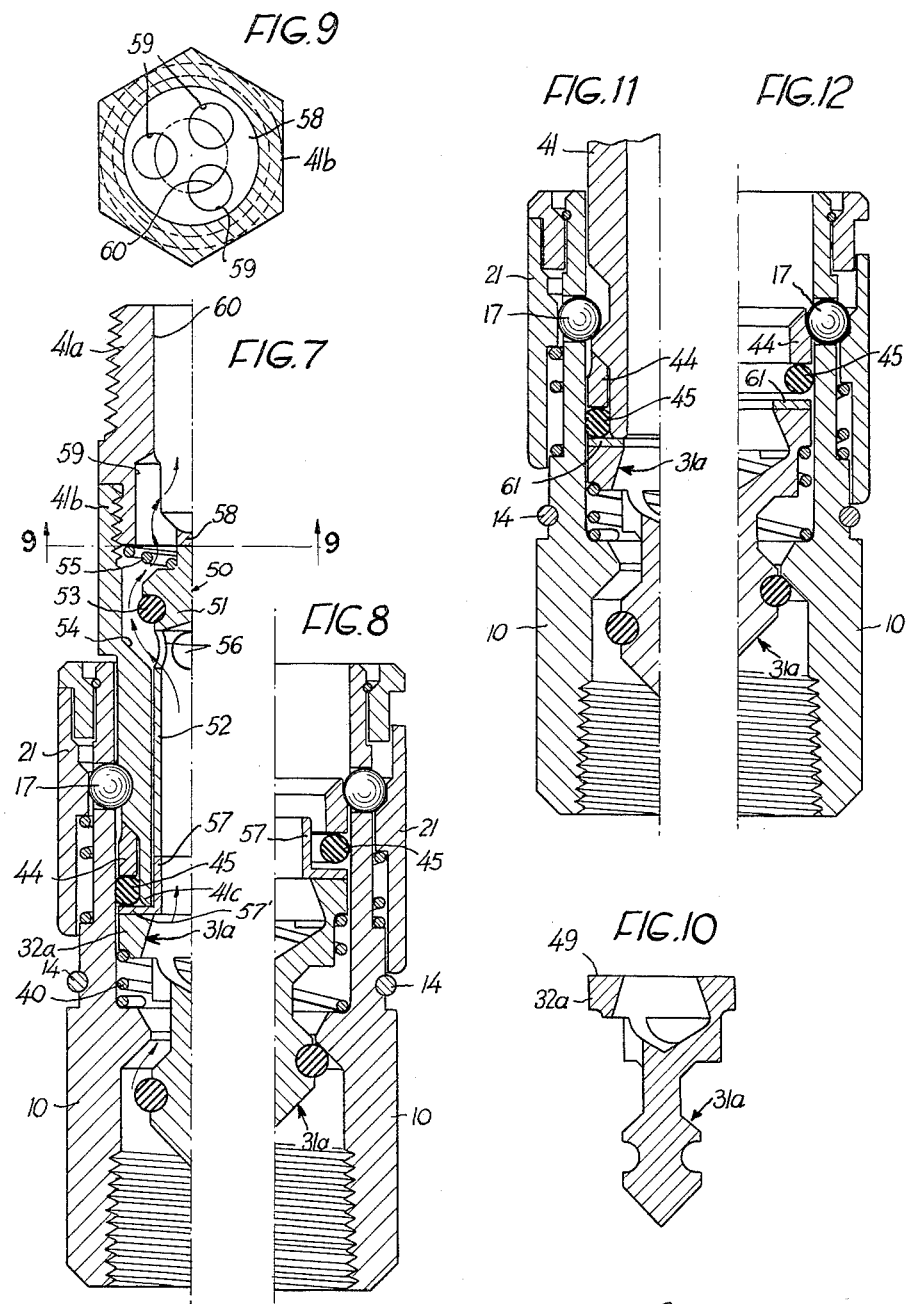

3,052,261
FLUID COUPLING
Carl Erik Josef Nyberg, Clasborgsvagen 32,
Skovde, Sweden
Filed Jan. 15, 1959, Ser. No. 787,033
2 Claims. (Cl. 137—614.04)

This invention relates to a fluid coupling for making and breaking connection between two fluid lines, such as a pair of hoses, one of which is connected to a source of fluid and the other of which is arranged to receive the fluid, such as air or water under pressure, which coupling includes an automatically operating valve for closing the end of the fluid-supplying line when the connection is broken or two automatically operating valves for closing the ends of both lines.

Among the objects of the invention is the provision of a coupling of the type described which has small overall dimensions and is comparatively light in weight. Another object is the provision of a coupling of this type which offers low resistance to the flow of fluid therethrough. Another object is to provide a coupling which is extremely easy to assemble without the necessity of special tools. Couplings of this type usually comprise a sealing ring to prevent leakage of fluid when the coupling members are locked together, and it is a further object of the invention to arrange the parts of the coupling so as to minimize wear of this sealing ring. Another object is to provide a construction which permits exchange of the above-named sealing ring without the necessity of breaking the connection between a source of fluid under pressure and the coupling. Still another object is the provision of a coupling which is simple to manipulate, reliable in operation and inexpensive to manufacture.

The invention comprises the arrangement and combination of elements exemplified in the embodiments hereinafter described with reference to the accompanying drawing in which FIG. 1 is a vertical section of the coupling with the coupling members locked together, FIG. 2 a similar section showing the coupling in the disconnected state, FIG. 3 an end view of the valve member of the coupling as viewed in the direction of the arrows 3—3 in FIG. 4, FIG. 4 a section of the valve member along the line 4—4 in FIG. 3, FIG. 5 a vertical section of a slightly modified embodiment of the coupling in locked position, FIG. 6 a similar section of the modified coupling in unlocked position, FIG. 7 a vertical section of a coupling in locked position and with automatic valves in both coupling members, FIG. 8 a similar section in unlocked position, FIG. 9 a section taken on line 9—9 of FIG. 7, FIG. 10 a section of the valve similar to FIG. 4, FIG. 11 a vertical section of the coupling member shown in FIG. 7 locked to a nipple of the type shown in FIG. 1 and FIG. 12 a similar section with detached nipples.

Referring to FIG. 1, the coupling comprises a female body portion or shell 10 which has an internally threaded end portion 11 for connection with a fluid-supplying line, not shown. The outer surface of the shell 10 has four different diameters so as to form shoulders 12, 13 and 23. The outer surface of the shell also has annular grooves which receive detachable snap rings 14 and 15. At some distance from its upper end, the shell 10 has radial openings 16 for locking balls 17. The inner ends of the openings 16 are slightly tapering so as to prevent the balls 17 from falling into the interior of the shell. As shown in FIG. 1, the balls 17 can project to a certain extent beyond the inner surface of the shell 10. The shell has an internal enlargement or flange 18 which forms a valve seat 19 and a shoulder 20.

A sleeve 21 is slidably mounted on the shell 10 and on a ring 22 which is held in place on the shell 10 by the snap ring 15 and the shoulder 23 formed on the shell 10. Below the ring 22, the sleeve has a cylindrical surface 24 which merges into an internal flange 28 having an upper beveled surface 25, a cylindrical surface 26 of reduced diameter and a shoulder 27. A helical spring 29 which bears on the shoulders 13 and 27 biases the sleeve 21 upwards into abutment with a shoulder 30 on the ring 22.

Slidably mounted in the bore of the shell 10 above the internal flange 18 is a valve generally designated at 31. As will be seen more clearly from FIGS. 3 and 4, the valve is a single-piece structure comprising a tubular head portion 32 and a sealing portion 33 which is connected to the head portion by means of three angularly spaced webs or bridges 34. As will be seen from FIG. 4, the inner faces of the bridges 34 merge smoothly into the inner conical face 35 of the head portion 32. The bridges are comparatively thin so as not to restrict the flow of fluid through the coupling, their shape being clearly apparent from the right-hand part of FIG. 4. The head portion 32 of the valve has a lower shoulder 36 and an upper shoulder 37. The seat portion 33 of the valve has a circular groove 38 for a sealing ring 39. A helical compression spring 40 bears on the shoulders 20 and 36 and biases the valve to closed position in which the ring 39 is brought into sealing engagement with the seat 19.

The second or male coupling member is a nipple or fitting 41 adapted to be introduced into the bore of the shell 10 and connected with a fluid receiving hose or like member, not shown. The nipple has an annular groove 42 adapted to receive the inwardly projecting portions of the balls 17. Below the groove 42, the nipple 41 has an annular flange 43 the diameter of which is smaller than the internal diameter of the shell 10. The inner or lower end of the nipple 41 is shaped to bear on the shoulder 37 of the head portion of the valve 31. Below the flange 43 of the nipple there is shown a holding or guard ring 44. The lower portion of the ring 44 fits slidingly in the bore of the shell 10, whereas the upper portion of the ring has a smaller diameter equal to the diameter of the flange 43. The sealing ring 45 consists of rubber or similar material with substantially circular cross-section and is disposed between the holding ring 44 and the upper end face of the valve 31.

In FIG. 1, the coupling member 10 and 41 are locked together and the valve 31 is automatically held in open position, i.e. its lower end position, in which the lower end face of the nipple 41 bears on the shoulder 37 against the action of the spring 40. Fluid can pass through the coupling as indicated by the arrows. The sleeve 21 is in its top end position in abutment with the ring 22 and is held in this position by the spring 29. The surface 26 of the flange 28 is flush with the outside of the locking balls 17 which project inwardly into the groove 42 of the nipple 41, thus preventing upward movement of the nipple and the valve. Leakage of fluid between the inner surface of the holding ring 44 and the outer surface of the lower portion of the nipple 41 and between the outer surface of the holding ring 44 and the inner surface of the shell 10 is prevented by the sealing ring 45 which in an air-tight manner bears on the outer surface of the nipple and the inner surface of the shell. Consequently, the shell 10 and the nipple 41 are locked together in sealing relation.

To disconnect the coupling it is merely necessary to slide the sleeve 21 downwards against the action of the spring 29 into the position shown in FIG. 2, the downward movement of the sleeve being limited by the snap ring 14. Now, the spring 40 can push the valve 31 and the nipple 41 upwards, since the balls 17 can move radially outwards into abutment with the surface 24 which has a larger diameter than the surface 26. As a result thereof, the flange 43 of the nipple can move upwardly beyond the balls 17 so that the nipple can be entirely withdrawn.

Under the action of the spring 40, the valve 31 is moved upwardly until the sealing ring 39 is brought into sealing engagement with the seat 19 and the valve is firmly closed, the pressure of the fluid acting from below on the valve contributing towards an air-tight seal to shut off further flow of fluid from the end of the fluid-supplying line. From FIG. 2 it will be apparent that the holding ring 44 can not be withdrawn from the shell, since the lower portion of this ring cannot pass beyond the balls 17. The upper portion of the ring 44 prevents the balls from moving inwardly into the position shown in FIG. 1, in which event the sleeve 21 would be free to slide upwards and hold the balls in their inner positions in which they would block introduction of the nipple, since the flange 43 could then not pass beyond the balls.

It will be seen from FIG. 2 that the location of the upper end face of the valve in the closed position and the height and location of the holding ring 44 (as defined by the location of the openings 16 in the sleeve 10) are related so that in the position shown in FIG. 2 the distance between the lower end face of the holding ring 44 and the upper end face of the valve is greater than the diameter of the cross section of the sealing ring 45. In other words, the ring 45 will not be engaged by the upper end of the valve. Therefore, the entire pressure exerted by the spring 40 is used to press the sealing ring 39 of the valve against the seat 19.

To lock the coupling members together again it is merely necessary to introduce the nipple 41 into the bore of the shell 10 against the action of the valve spring 40 until the nipple 41 again assumes the position shown in FIG. 1. In this position, the beveled surface 25 of the sleeve 21 cams the balls inwards into locking position under the action of the spring 29 which then automatically pushes the sleeve 21 upwards into the position shown in FIG. 1. The coupling members are then again locked together and the valve 31 is held open. In this service position, the upper end face of the sleeve 21 abuts against the shoulder 30 of the ring 22 and prevents entrance of sand or other foreign matter between these parts. Although the coupling members are firmly locked to each other they can be turned relatively to each other as may be required in practical service. It should be noted that the particular construction of the valve 31 as described provides for a practically unrestricted flow of fluid through the coupling without abrupt changes in direction of flow as indicated by the arrows in FIG. 1, thus providing a low degree of resistance to flow.

In FIG. 1, the sealing ring 45 abuts elastically against the outer surface of the nipple 41 as well as against the inner surface of the shell 10. When the nipple moves relatively to the shell, the ring 45 because of its frictional engagement with two above-named surfaces will be caused to roll upwards or downwards, as the case may be, around its own circular axis and will therefore be subject to rolling friction rather than sliding friction, this resulting in a considerable reduction of wear and longer life of the ring.

Exchange of a worn ring 45 for a new one can be effected without the necessity of reducing the pressure in the fluid-supplying line. To this end, starting from the position shown in FIG. 2, the snap ring 14 is removed from the shell 10 so that the sleeve 21 can be slid downwardly into abutment with the shoulder 12. In this position, the locking balls 17 are flush with the surface 46 of the sleeve which has a greater diameter than the surface 24. The holding ring 44 can then be withdrawn from the shell, since the balls 17 can move radially outwards to clear the way for the ring 44. The ring 45 can now be taken out and a new ring inserted in its place, whereupon the ring 44 is re-introduced, the sleeve 21 is moved upwards and the snap ring 14 is put in its place again. During this manipulation, the valve 31 is retained in closed position.

Assembling of the various parts of the coupling can be effected very quickly with the add of suitable tools which form no part of the invention; but even at occasions where such tools are not available, the coupling can be assembled quickly and easily enough, for instance in the following manner. The balls 17 are introduced into the openings 16, the spring 29 is applied, the sleeve 21 is mounted on the shell 10, and the ring 22 is inserted between the shell and the sleeve and secured in place by the snap ring 15. With the sleeve 21 in its lowermost end position in abutment with the shoulder 12, valve spring 40, valve 31, sealing ring 45 and holding ring 44 are introduced from above into the bore of the shell in the order named. Thereafter the sleeve 21 is moved upwards and the snap ring 14 inserted in its groove on the shell. Then the nipple 41 is introduced and locked in the position shown in FIG. 1, whereupon the elastic sealing ring 39 is urged from below into its groove 38.

According to the slightly modified embodiment illustrated in FIGS. 5 and 6, the valve 31 and the holding ring are a single-piece structure, the part 44a forming the holding ring being an axial annular extension of the head portion 32 of the valve. On the one hand, this is a simplification as compared with the structure shown in FIGS. 1–4, but, on the other hand, there must be provided two sealing rings 47 and 48 instead of the single sealing ring 45 in FIGS. 1 and 2. In other respects, the details of construction and operation are the same as in the previously described embodiment.

The coupling illustrated in FIGS. 7 to 10 has two valves which automatically close the ends of both fluid lines when the connection is broken, which may be desirable if the fluid is water or another liquid. The first valve 31a is similar to the above-described valve 31, but has a head portion 32a of smaller height or axial extension and a plane top end 49, FIG. 10. The nipple or fitting consists of two tubes 41a and 41b screwed together as shown in FIG. 7. The second valve 50 has a solid head portion 51 and a tubular portion 52 of reduced outer diameter which slidingly fits in the lower portion of the bore of the tube 41b. A sealing ring 53 on the head portion 51 is arranged to bear on a seat 54 formed on the inside of the tube 41b. A conical spring 55 inserted between the head portion 51 and the bottom end of the tube 41a tends to urge the valve 50 into closing position. The tubular portion 52 has angularly spaced-apart openings 56 for the passage of fluid in the interlocked position of the coupling members shown in FIG. 7. Interposed between the tubular portion 52 and the top end 49 of valve 31a is a spacing ring 57 which is L-shaped in cross-section, the radial limb of the L (represented by a radial flange 57') being located between the top end 49 and the sealing ring 45 while the axial limb is flush with the tubular portion 52. The tube 41a has a bottom end wall 58 through which extend angularly spaced holes or bores 59 which merge into the central channel or bore 60 of this tube. An extremity 41c of tube 41b, of reduced external diameter, serves as a stop for valve member 31a upon which it acts through the intermediary of flange 57' to limit the upward displacement of that valve member toward its closed position (FIG. 8).

With the parts in the positions shown in FIG. 7, the balls 17 lock the nipple 41a, 41b to the shell 10 as previously described. Upon introduction of the nipple, the valve 50 is pushed upwards relatively to the nipple by engagement with the ring 57 until the valve 50 abuts against the end wall 58 and fluid can flow through the openings 56. At the time time, the first valve 31a is opened and is then held in open position by the inter-engaging parts 57, 50 and 58. It will be understood that the second valve spring 55 must be weaker than the first valve spring 40 so as to enable the valve 50 to be pushed upwards under the differential action of the two springs.

Upon detachment of the coupling members by means of the sleeve 21 as previously described, both valves 31a and 50 will be instantaneously closed by their respective springs 40 and 55 to prevent outflow of fluid from either line.

If it is desired to use the coupling member of the fluid-supplying line as shown in FIG. 8 in connection with a nipple of the type shown in FIG. 1, it is merely necessary to replace the ring 57 by a flat ring 61 as shown in FIGS. 11 and 12. Exchange of these rings can be effected in the same manner as described above with reference to the sealing ring 45. The flat ring 61 serves to compensate for the smaller height of the head portion 32a of the valve 31a as compared with the head portion 32 of the valve 31, in order to reduce the axial clearance for the sealing ring 45. Exchange of the rings 57 and 61 is considered preferable to replacement of the guard ring 44 by a longer one which, while serving the same purpose, would be more expensive.

While several possible embodiments of the invention are illustrated in the drawing, it is to be understood that the invention is not limited thereto but may be modified in many respects within the scope of the appending claims.

What I claimed is:

1. In a fluid coupling, in combination, a female coupling member of tubular configuration having a generally cylindrical bore with an open end connectable to a fluid line, a tubular male coupling member releasably held in said bore and provided with an internal channel communicating therewith, a first valve member axially slidable in said bore between an open position relatively close to said open end and a closed position relatively remote from said open end, first spring means in said bore bearing upon the body of said female coupling member and upon said first valve member for axially urging the latter from its open position toward its closed position, a second valve member axially slidable in said channel between an open position relatively remote from said open end and a closed position relatively close to said open end, second spring means weaker than said first spring means in said channel bearing upon the body of said male coupling member and upon said second valve member for axially urging the latter from its open position toward its closed position, and stop means rigid with the body of said male coupling member adapted and disposed to arrest said first valve member in an open position of the latter for limiting the displacement of said first valve member by said first spring means toward its closed position, said first valve member being biased by said first spring means, to the extent permitted by said stop means, into pressure-exerting relationship with said second valve member for maintaining same in its open position against the force of said second spring means.

2. In a fluid coupling, in combination, a female coupling member of tubular configuration having a generally cylindrical bore with an open end connectable to a fluid line, a tubular male coupling member releasably held in said bore and provided with an internal channel communicating therewith, a first valve member axially slidable in said bore between an open position relatively close to said open end and a closed position relatively remote from said open end, first spring means in said bore bearing upon the body of said female coupling member and upon said first valve member for axially urging the latter from its open position toward its closed position, a second valve member axially slidable in said channel between an open position relatively remote from said open end and a closed position relatively close to said open end, second spring means weaker than said first spring means in said channel bearing upon the body of said male coupling member and upon said second valve member for axially urging the latter from its open position toward its closed position, a spacing ring slidably received in said channel and provided with an external radial flange, said male coupling member being provided with an extension of reduced external diameter adapted and disposed to act upon said first valve member through the intermediary of said flange in and open position of said first valve member for limiting the displacement thereof by said first spring means toward its closed position, said first valve member being biased by said first spring means, to the extent permitted by said flange and said extension, into pressure-exerting relationship with said second valve member for maintaining same in its open position against the force of said second spring means, an elastically deformable sealing ring of circular cross-section movably inserted in said bore between said extension and said female coupling member adjacent said flange, and a guard ring surrounding said extension within said bore on the side of said sealing ring remote from said flange, said guard ring being entrainable by said male coupling member for holding said sealing ring in contact with said flange.

References Cited in the file of this patent

UNITED STATES PATENTS

| | | |
|---|---|---|
| 2,279,146 | Schneller | Apr. 7, 1942 |
| 2,457,251 | Main | Dec. 28, 1948 |
| 2,690,917 | Chandler | Oct. 5, 1954 |
| 2,706,646 | Olson | Apr. 19, 1955 |
| 2,809,658 | Frantz et al. | Oct. 15, 1957 |
| 2,842,381 | Franck | July 8, 1958 |
| 2,842,382 | Franck | July 8, 1958 |
| 2,919,935 | Nyberg | Jan. 5, 1960 |

FOREIGN PATENTS

| | | |
|---|---|---|
| 20,039 | Great Britain | Sept. 17, 1903 |